[12] United States Patent
Kishi et al.

(10) Patent No.: US 12,323,522 B2
(45) Date of Patent: Jun. 3, 2025

(54) DETERMINING FACET VALUES FOR SENSITIVE INFORMATION IN A DATA OBJECT TO DETERMINE AN ENCRYPTION TECHNIQUE TO ENCRYPT THE DATA OBJECT FOR BACKUP

(71) Applicant: INTERNATIONAL BUSINESS MACHINES CORPORATION, Armonk, NY (US)

(72) Inventors: Gregory T. Kishi, Oro Valley, AZ (US); Joseph W. Dain, Vail, AZ (US); Abhishek Jain, Baraut (IN); Nilesh Prabhakar Bhosale, Warje (IN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 17/095,522

(22) Filed: Nov. 11, 2020

(65) Prior Publication Data

US 2022/0150065 A1 May 12, 2022

(51) Int. Cl.
*H04L 9/32* (2006.01)
*G06F 11/14* (2006.01)

(52) U.S. Cl.
CPC ............ *H04L 9/32* (2013.01); *G06F 11/1451* (2013.01)

(58) Field of Classification Search
CPC ......... H04L 9/32; H04L 9/088; H04L 9/0894; G06F 11/1451; G06F 21/6245; G06F 11/1456
See application file for complete search history.

(56) References Cited

U.S. PATENT DOCUMENTS

| | | | |
|---|---|---|---|
| 6,477,585 B1 | 11/2002 | Cohen et al. | |
| 7,467,212 B2 | 12/2008 | Adams et al. | |
| 8,161,527 B2 | 4/2012 | Curren | |
| 9,038,193 B2 | 5/2015 | Burgess et al. | |
| 9,571,463 B2 | 2/2017 | Strayer et al. | |
| 9,648,042 B2 | 5/2017 | Cho | |
| 10,367,851 B2 | 7/2019 | Eldar et al. | |
| 11,418,483 B1* | 8/2022 | Cupp | H04L 63/0209 |
| 2007/0174909 A1 | 7/2007 | Burchett et al. | |
| 2013/0133026 A1 | 5/2013 | Burgess | |
| 2014/0201526 A1 | 7/2014 | Burgess | |
| 2016/0078245 A1* | 3/2016 | Amarendran | G06N 20/00 |
| | | | 713/193 |
| 2019/0286842 A1* | 9/2019 | Keles | G06F 21/30 |
| 2020/0073978 A1 | 3/2020 | Dain et al. | |
| 2020/0133554 A1 | 4/2020 | Kishi et al. | |
| 2020/0134062 A1 | 4/2020 | Kishi et al. | |
| 2020/0159771 A1 | 5/2020 | Dain et al. | |
| 2020/0159952 A1 | 5/2020 | Dain et al. | |

\* cited by examiner

*Primary Examiner* — Huan V Doan
(74) *Attorney, Agent, or Firm* — Konrad, Raynes, Davda & Victor LLP; David W. Victor

(57) ABSTRACT

Provided are a computer program product, system, and method for determining an encryption technique for a modified data object to backup. Deep data inspection is performed on an object using a natural language processing module to determine facets for the object. The facets provide facet values for instances of sensitive information in the object. The facet values for the object are processed to determine a cumulative facet value. A determination is made of an encryption technique comprising one of a plurality of different encryption techniques to use on the object based on the cumulative facet value. The determined encryption technique is used to encrypt the object to transfer to a backup storage.

25 Claims, 6 Drawing Sheets

Event Message

Database Record

Security Level Rule

DETERMINING FACET VALUES FOR SENSITIVE INFORMATION IN A DATA OBJECT TO DETERMINE AN ENCRYPTION TECHNIQUE TO ENCRYPT THE DATA OBJECT FOR BACKUP

BACKGROUND OF THE INVENTION

1. Field of the Invention

The present invention relates to a computer program product, system, and method for determining facet values for sensitive information in a data object to determine an encryption technique to encrypt the data object for backup

2. Description of the Related Art

Data objects in a large-scale storage environment may be stored in distributed storage systems. As data is generated and modified at ever increasing rapid speeds and the amount of data exponentially increases, the computational efforts to process data for management purposes based on organizational policies likewise increases.

Many large-scale storage environments store sensitive data, such as personally identifiable information, financial information, health information, etc., that needs to be encrypted before backing up in a cloud data service. Current cryptographic techniques to mitigate security concerns for transfer of backup data to cloud storage require heavy computational overhead on the data owner as well as the cloud service provider for key distribution and management. Encryption is required to transfer sensitive data securely over the network. Typically, in a storage environment, data is replicated to a remote site for disaster recovery. During transfer to remote cloud storage, data is sent as is (without encryption) or encrypted.

Given the computational cost and processor cycles needed to encrypt large data sets for backup storage, there is a need in the art for improved techniques to encrypt data objects having sensitive information being transferred to backup storage locations.

SUMMARY

Provided are a computer program product, system, and method for determining an encryption technique for a modified data object to backup. Deep data inspection is performed on an object using a natural language processing module to determine facets for the object. The facets provide facet values for instances of sensitive information in the object. The facet values for the object are processed to determine a cumulative facet value. A determination is made of an encryption technique comprising one of a plurality of different encryption techniques to use on the object based on the cumulative facet value. The determined encryption technique is used to encrypt the object to transfer to a backup storage.

In the above embodiment, an encryption technique is selected based on the amount of sensitive information as represented by a cumulative facet value for the object. In this way, the selected encryption level seeks to minimize use of computational resources by selecting a higher encryption level for objects having a greater level of sensitive information, which requires a relatively more computational resources, but using a lower level or no level of encryption for objects having lower amounts of sensitive information, which do not need the more computationally expensive higher levels of encryption.

In a further embodiment, a determination is made of a data transfer mechanism based on the cumulative facet value. The encrypted object is transferred to the backup storage using the determined transfer mechanism.

With the above embodiment, computational resources are further optimized by also selecting a data transfer mechanism based on the cumulative facet value for the object. Objects having a greater level of sensitive information may be transferred using a more secure communication protocol, which requires a greater amount of computational resources, than a data transfer mechanism using less security and encryption.

In a further embodiment, a determination is made of a security level, of a plurality of security levels, associated with the cumulative facet value. Each of the security levels are associated with at least one cumulative facet value and each of the security levels is associated with one of the encryption techniques. Determining the encryption technique based on the cumulative facet value comprises determining the encryption technique associated with the determined security level for the object.

Withe the above embodiment, different security levels map to different ranges of cumulative facet values. In this way, one of numerous different possible cumulative facet values will map to one of a fewer number of security levels, where each security level is associated with a different encryption technique. This optimizes the allocation of computational resources because a higher security level associated with greater cumulative facet values is associated with a more computationally expensive higher encryption level. Ranges of relatively lower cumulative facet values are associated with lower security levels requiring a less computationally expensive encryption technique than the higher security levels to conserve computational resources for those objects having a relatively lower amount of sensitive information.

In a further embodiment, there is an association of backup storage locations and security levels. A first security level associated with cumulative facet values indicating a high level of sensitive information is associated with a first backup storage location providing a higher level of security than a second backup storage location. A second security level lower than the first security level is associated with the second backup storage location. The encrypted object is transferred to the first backup storage location in response to the security level comprising the first security level. The encrypted object is transferred to the second backup storage location in response to the security level comprising the second security level.

With the above embodiment, the security levels are also associated with different backup storage locations. Backup storage locations and cloud services providing higher levels of security and encryption may cost more than storage locations having lower levels of security and less computationally expensive encryption methods. In this way, backup storage costs are minimized because the more expensive higher security backup storage locations are only used for objects having a greater amount of sensitive information represented by a higher cumulative facet value, whereas objects having a lower amount of sensitive information are transferred to less costly backup storage locations offering less encryption and security.

Further provided are a computer program product, system, and method for determining an encryption technique for a modified data object to backup. Event messages are received for objects in response to writes to objects. The event messages are added to a message queue. Deep data inspection is performed on an object using a natural language processing module to determine facets for the object, wherein the facets provide facet values for instances of sensitive information in the object. A determination is made of an encryption technique comprising one of a plurality of different encryption techniques to use on the object based on a cumulative facet value calculated from the facet values determined for the object. The determined encryption technique is used to encrypt the object to transfer to a backup storage.

With the above embodiment, a message queue is used to receive event messages for modified objects and deep data inspection is performed for an object when processing the event message for the object in the message queue to determine the facet values in the object from which the security level and encryption technique are determined. This embodiment provides for processing of objects in the message queue upon receipt in the message queue to allow for real-time determination of changes to the amount of sensitive information in an object to determine an adjusted security level, which could require a greater or lower level of encryption than currently used for the object.

In a further embodiment, information is added to a database for each of the event messages in the message queue for the objects modified by writes. The facet values determined for the object, resulting from the deep data inspection, are also added to the information in the database for the event message for the modified object.

With the above embodiment, a database is updated immediately with changed facet values and a newly calculated security level upon processing information on a modified object in a message queue. This provides the database with real-time information on the amount of sensitive information in the object for use in determining the security level and corresponding encryption technique to use for the object when the database is queried to determine an object to transfer to a backup location. In this way, information on modified facet values and a security level is included in the database for consideration next time the database is queried to determine objects to transfer and their security levels.

In a further embodiment, the deep data inspection to determine the facet values used to determine the encryption technique is determined in response to adding the event message for the object to the message queue.

With the above embodiment, the determination of new facet values for an object, to determine the current security level, is determined directly when processing the event information for an object in the message queue, so that the new security level information can be immediately used to determine an encryption technique when transferring the object. This allows for determination of the security level upon processing the message queue without having to wait for a database to be updated and queried to allow for immediate use of a different encryption technique associated with an adjusted security level of the object. This allows for the immediate optimization of selection of the encryption technique.

DETAILED DESCRIPTION

Data transfer to remote sites and third party cloud storage services is required to maintain data redundancy for disaster recovery. However, overall system performance is impacted to encrypt all files and objects that are transferred. In large-scale storage environments having files distributed across numerous storage systems, encrypting all data to backup would require substantial computational resources. This encryption of all data may result in unnecessary allocation of computational resources because not all data objects have sensitive information that need computationally expensive strong encryption techniques. Further, encrypting everything before transfer results in more noise than value.

Described embodiments seek to address these concerns by selecting an encryption technique based on the degree of sensitive information in objects being transferred to determine the type of secure algorithm/key-strength that should be applied on data objects for encryption. Described embodiments further provide for dynamic determinations of security levels and encryption techniques to apply to data because the sensitivity and security level and classification of data evolves and varies overtime. Described embodiments leverage dynamic and continuous deep inspection of data to determine the security level in order to minimize computations necessary to encrypt the data to an appropriate level based on the amount of sensitive information in the data.

Described embodiments provide improvements to computer technology for encrypting data by providing real-time deep data inspection of modified data objects to determine facet values for facets of sensitive information in the data objects that can be used to determine a sensitivity level of the data object. The sensitivity level may then be used to determine an encryption technique, data transfer mechanism, and backup storage location to use for the data object. Those data objects having a higher sensitivity level may be subject to more computationally expensive and secure encryption techniques and data transport mechanisms, while those data objects with a lower sensitivity level may be subject to less computationally expensive encryption and data transfer. This optimizes the application of computational resources based on the security level for the data objects.

Figure 1:
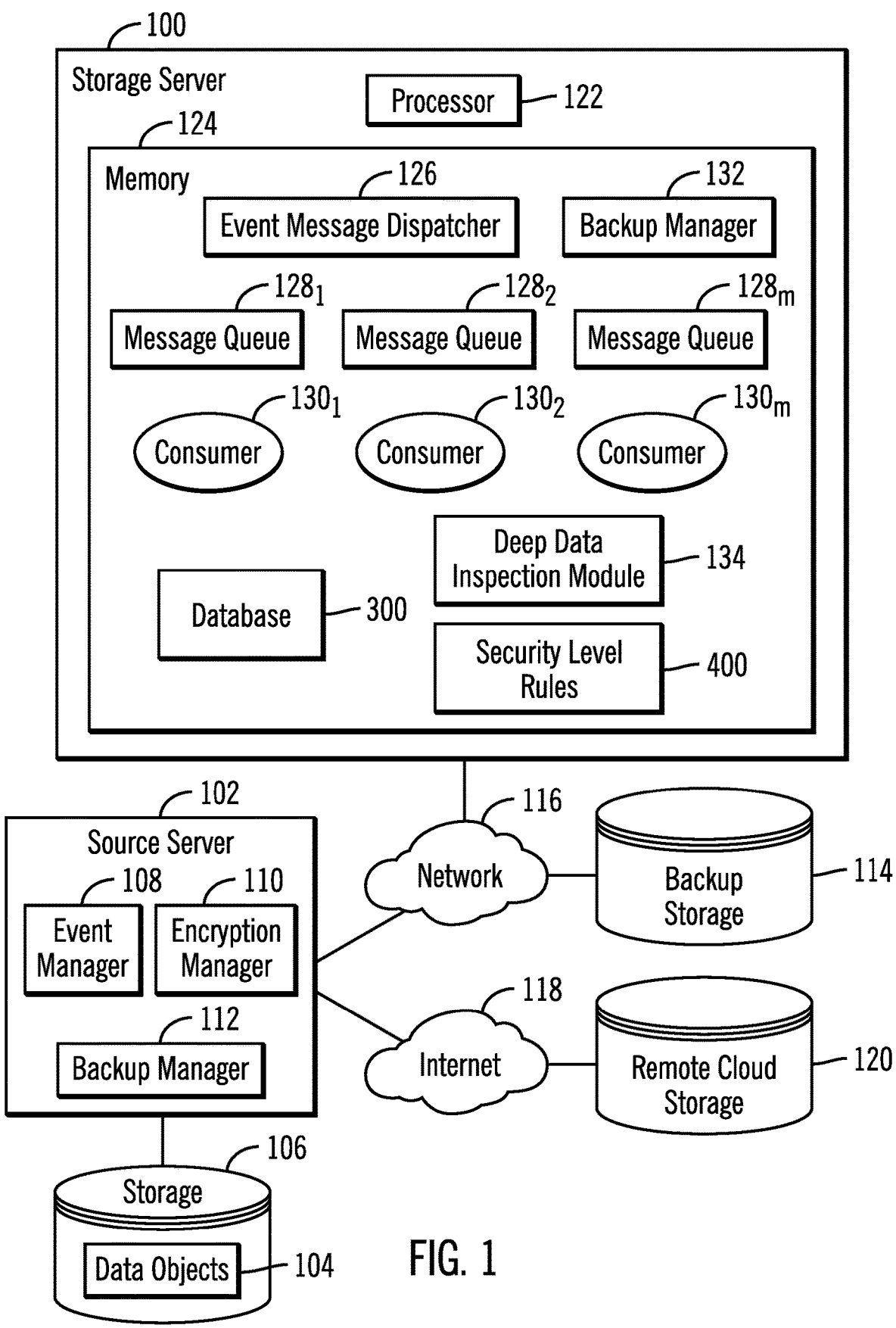
FIG. 1 illustrates an embodiment of a storage environment.

FIG. 1 illustrates an embodiment of a storage environment including a storage server 100 that receives event messages 200 (FIG. 2) from one or more source servers, shown as source server 102, that are generated when a source server 102 applies an update to a data object 104 in a storage 106, wherein each source server 102 may have one or more associated storage 106. Although one source server 102 and managed storage 106 is shown, there may be multiple instance of the source server 102 and storage 106. The update to a data object 104 may comprise a delete, modification or adding of a data object. A data object or object 104 may comprise a file, database object, logical blocks, volume, chunks, extents or any other storage unit in which data may be separately manipulated and addressed. An event manager 108 at the source server 102 creates and sends event messages 200 to the storage server 100 upon the source server 102 processing a write or modification to a data object 104 from an application in a host system in real-time before the modification is applied to the storage 106. In this way, the storage server 100 receives event messages 200 (FIG. 2) on modifications to data objects 104 immediately in real-time when the changes are made, and in certain embodiments before the changes are applied to the storage 106.

The source servers 102 further include an encryption manager 110 to encrypt the data objects 104 before a backup manager 112 transfers the updated data object 104 to a backup storage 114 in a local or private network 116 or transfers the updated data object 104 over the internet 118 or other public network to a remote cloud storage 120 provided as part of a remote storage service, such as a cloud object storage provider, including, IBM® Cloud Storage System, Amazon Web Services®, Microsoft® Azure Cloud Storage, etc. (Amazon and Amazon Web Services are trademarks of Amazon Technologies, Inc.; IBM and Cloud Object Storage System are trademarks of IBM throughout the world; and Microsoft and Azure are trademarks of Microsoft throughout the world).

The storage server 100 includes a processor 122, such as one or more processor devices, and a memory 124 having program code executed by the processor 122, including an event message dispatcher 126 to process event messages 200 from an event manager 108 at a source server 102 and to add the received event message 200 to one or more message queues $128_1, 128_2 \ldots 128_m$ in the memory 124. For instance there may be a message queue $128_1$ for each storage 106. An event message 200 for an update to a data object in a storage 106 is added to the message queue $128_1$ for the storage 106 having the updated data object. The memory 124 may further include one or more consumers $130_1, 130_2 \ldots 130_m$ to process event messages 200 in one or more of the message queues $128_1, 128_2 \ldots 128_m$ to convert the information on an updated data object in an event message 200 to a database record $300_i$ (FIG. 3) to store in a database 300.

The event manager 108 at the source server 102 may generate an event message 200 immediately upon receiving the update to the data object 104 before the update is applied to the storage 106. In this way, the event messages 200 provide real time information on updates to the data objects 104 to the storage server 100 so that the database 300 has current information on changed data objects 104 and their facets describing sensitive information in the data objects 104. Facets represent clearly defined, mutually exclusive, and collectively exhaustive aspects of the subject of sensitive information, and includes the component parts of sensitive information, such as aspects, properties and characteristics. The facets have values for the aspect or attribute of sensitive information they represent.

Upon receiving an event message 200, the event message dispatcher 126 adds the event message 200 to an event message queue $128_i$. The event message queue $128_i$ may be selected based on workload load balancing to evenly distribute messages 200 among the message queues $128_i$ or having storages 106 assigned to message queues, so an event message 200 is added to the message queue $128_i$ associated with the storage 106 in which the data object 104 of the event message is stored.

The storage server 100 may further include a backup manager 132 to coordinate with the source server 102 backup manager 112 operations for the backup manager 112 to mirror data objects 104 to a remote backup 114, 120. The backup manager 132 and consumers $130_1, 130_2 \ldots 130_m$ may invoke a deep data inspection module 134 to process content and metadata for the data objects 104 and determines facets of sensitive information in the data objects 104. For instance, the facet may indicate that a data field or instance in the object comprises a type of sensitive information. The term "sensitive information" as used herein may refer to any of, without limitation, personally identifiable information (e.g., social security number, name, address, phone number, etc.), financial information (bank and credit account numbers), sensitive business information (e.g., corporate and business tax and financial records, attorney client privileged documents, strategic planning, trade secrets, product development plans, patent applications, technical disclosures, human resource records, etc.) medical information, such as diagnosis and prescriptions, etc. Facet values identifying a type of sensitive information included in the data object 104 provide a true or false value. Facet values indicating a number of occurrences of a sensitive information instance in the document may be a value that indicates the number of occurrences of the sensitive information.

The deep data inspection module 134 may utilize a natural language classification program that collects and analyzes content in the data objects 104 to classify sensitive information in the data objects 104 as facets based on processing of the metadata and content of the data objects 104. The deep data inspection module 134 may use natural language processing (NLP) utilizing ontology based natural language classification techniques to extract the facet values for sensitive information instances in the object. The deep data inspection module 134 may use deep inspection techniques such as IBM® Watson™ Explorer Content analytics, StoredIQ, Sentiment Analytics, Contextual Views based on natural language classification as well as Watson™ Application Programming Interfaces (APIs) such as speech to text, visual recognition, etc. These techniques help in capturing metadata information from data objects and determining a classification of sensitive information in the data objects 104. (IBM, Watson, and StoredIQ are trademarks of International Business Machines Corporation throughout the world).

Security level rules 400 may be applied to the facet values extracted by the deep data inspection module 134 to determine an encryption technique, transfer mechanism and appropriate backup storage for a security level calculated from the facet values. For instance, facet values indicating the data object 104 has a substantial amount of sensitive information may result in a sensitive level indicating to use a more computationally expensive stronger encryption technique, a more secure data transfer mechanism, e.g., virtual private network (VPN), Hypertext transfer protocol secure (HTTPS), Transport Layer Security (TLS), tape backup, etc., and a backup storage location, such as a third party cloud storage service or backup up storage 114 on an internal network 116.

In one embodiment, the deep data inspection module 134 may be implemented in the storage server 100 as shown in FIG. 1. Alternatively, the deep data inspection module 134 may be implemented in each of the source servers 102 to have the source servers 102 determine the facets for their data objects 104 to include in the event messages 200 to send to the storage server 100. In a still further embodiment, the deep inspection module $109_i$ may be implemented in a separate system or in a hardware device.

There may be any number of message queues $128_i$ and consumers $130_i$ to process the message queues $128_i$, where consumers $130_i$ may process requests from one or more of the message queues $128_i$.

The database 300 may comprise a No Structured Query Language (No SQL) database, an SQL database, a relational database, objected oriented database, Extended Markup Language (XML) database, and any other suitable database known in the art.

The storages 106, 114, 120 may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices implementing the storages 106, 114, 120 may comprise heterogeneous storage devices from different vendors and different types of storage devices, such as a first type of storage devices, e.g., hard disk drives, that have a slower data transfer rate than a second type of storage devices, e.g., SSDs.

The memory 124 may comprise a suitable volatile or non-volatile memory devices, including those described above.

Figure 2:
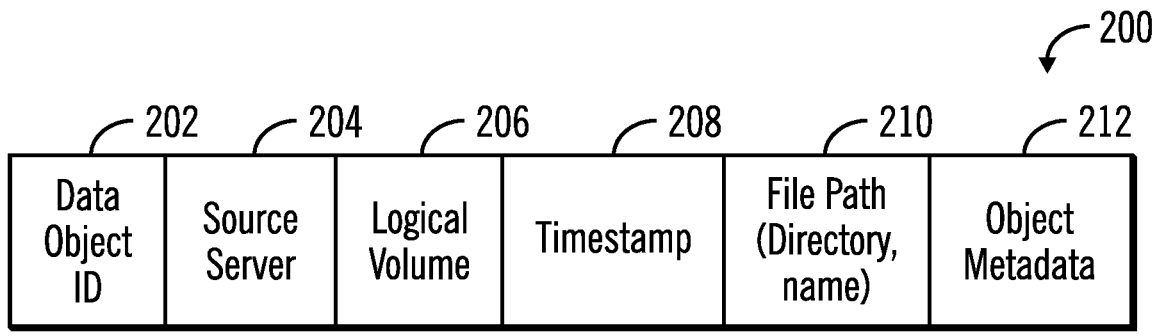
FIG. 2 illustrates an embodiment of an event message.

FIG. 2 illustrates an embodiment of an instance of an event message 200 generated by an event manager 108 to provide to the storage server 100 to use to determine encryption techniques, data transfer mechanism, and target backup storage location for data objects 104 to backup, and includes a data object ID 202 identifying a data object 104; a source server 204 managing the storage 106 including the data object 202; a logical volume 206 configured in the storage 106 in which the data object is stored, e.g., logical unit number (LUN), volume, logical drive, etc.; a timestamp 208 indicating a time the data object 202 was created and/or last modified; a file path 210, such as a directory name, including the data object 202; and object metadata 212 for the data object 202, indicating a type of data object, the application that created the data object, information on the user that invoked the application to create the data object, etc. The event message 200 may further include facet values for implementations where the deep data inspection module 134 is located in the source server 102.

Figure 3:
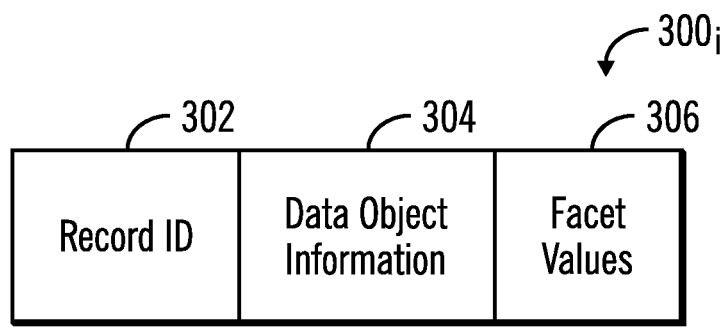
FIG. 3 illustrates an embodiment of database record.

FIG. 3 illustrates an embodiment of a database record $300_i$ in the database 300 and includes a record identifier (ID) 302 identifying the database record $300_i$ in the database 300, data object information 304, which may comprise all or some of the information in the event message 200 in fields of the database record $300_i$, and facet values 306 determined by the deep data inspection module 134. The database 300 may also include an index to allow fast searching of records $300_i$ based on relevant backup key/value pairs, such as the time the database object was last updated, data type, source data set, etc.

Figure 4:
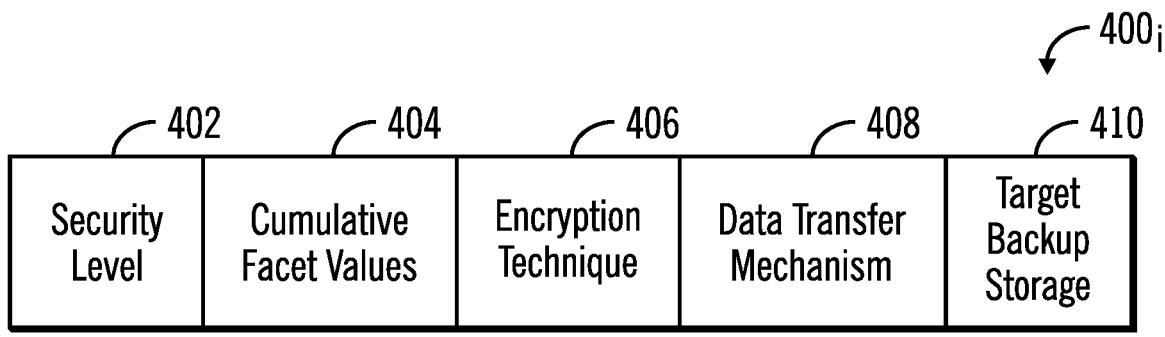
FIG. 4 illustrates an embodiment of a security level rule.

FIG. 4 illustrates an embodiment of an instance of a security level rule $400_i$ of the security level rules 400, that includes: a security level 402, where a higher level indicates a higher level of security to apply to the data object 104; one or more cumulative facet values 404 associated with the security level 402, such that a data object 104 determined to have a cumulative facet value within the set of cumulative facet values 404 has the security level 402; an encryption technique 406 to apply for the security level 402, e.g., a lowest security level may indicate no encryption, higher levels may indicate a Data Encryption Standard (DES), a high security level may indicate to use triple DES encryption (3DES) or other strong encryption techniques, and a highest security level may indicate to backup to tape; a data transfer mechanisms 408 to use to encapsulate the data object 104 packets to transmit over the network 116, 118, where a more secure data transfer mechanism is used for the higher security levels; and a backup location 410, where a higher security backup location 120 may be specified for a higher security level. In certain embodiments, a highest security level may indicate to backup the data objects 104 to tape or portable storage media to physically transport to an offsite storage location to avoid security risks of network transmissions.

Figure 5:
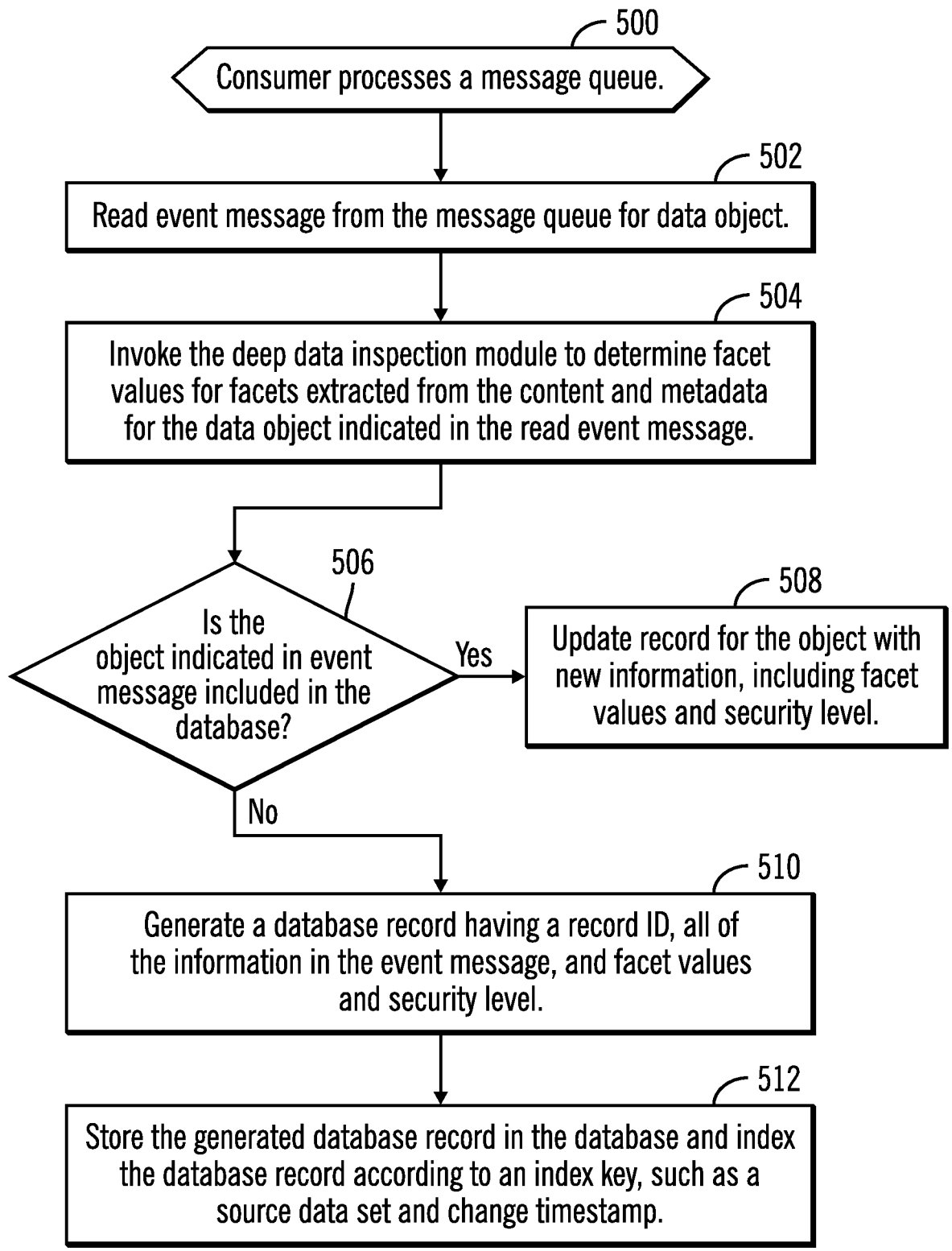
FIG. 5 illustrates an embodiment of operations to process an event message for a data object in a message queue to determine facet values for sensitive information of the data object.

FIG. 5 illustrates an embodiment of operations performed by a consumer $130_i$ process to process one or more event messages 200 in a message queue $128_i$. Upon a consumer $130_i$ processing (at block 700) a message queue $128_i$, the consumer $130_i$ reads (at block 502) an event message 200 from the message queue $128_i$. The consumer $130_i$ may then invoke (at block 504) the deep data inspection module 134 to determine facet values for facets extracted from the data object 104 content and metadata. If (at block 506) the data object 202 indicated in the event message 200 is in the database 300, i.e., there is a record $300_i$ for the object in the database 300, then the record $300_i$ for the object is updated (at block 508) with new information in the event message 200, such as updated metadata (e.g., 204, 206, 208, 210) and the extracted facet values 306 for facets of the object. If (at block 506) there is no record $300_i$ for the object indicated in the event message in the database 300, then the consumer $130_i$ generates (at block 510) a database record $300_i$ having a record ID 302 and database object information 304 comprising the information 202, 204, 206, 208, 210 in the received event message 200 and the extracted facet values 306. The generated database record $300_i$ is stored (at block 512) in the database 300 and indexed in a database index according to an index key, such as the change timestamp, facet values, etc.

With the embodiment of FIG. 5, information on real-time updates to data objects 104 are generated and provided to the storage server 100 to store in the database 300. In this way, the database 300 immediately reflects the current state of updates to data objects and facet values in the data objects to use to determine data a security level for the object. Further, the event message dispatcher 126 may receive event messages 200 from different storages 106 to allow the database 300 to reflect updates to data objects 104 in different storages 106.

Figure 6:
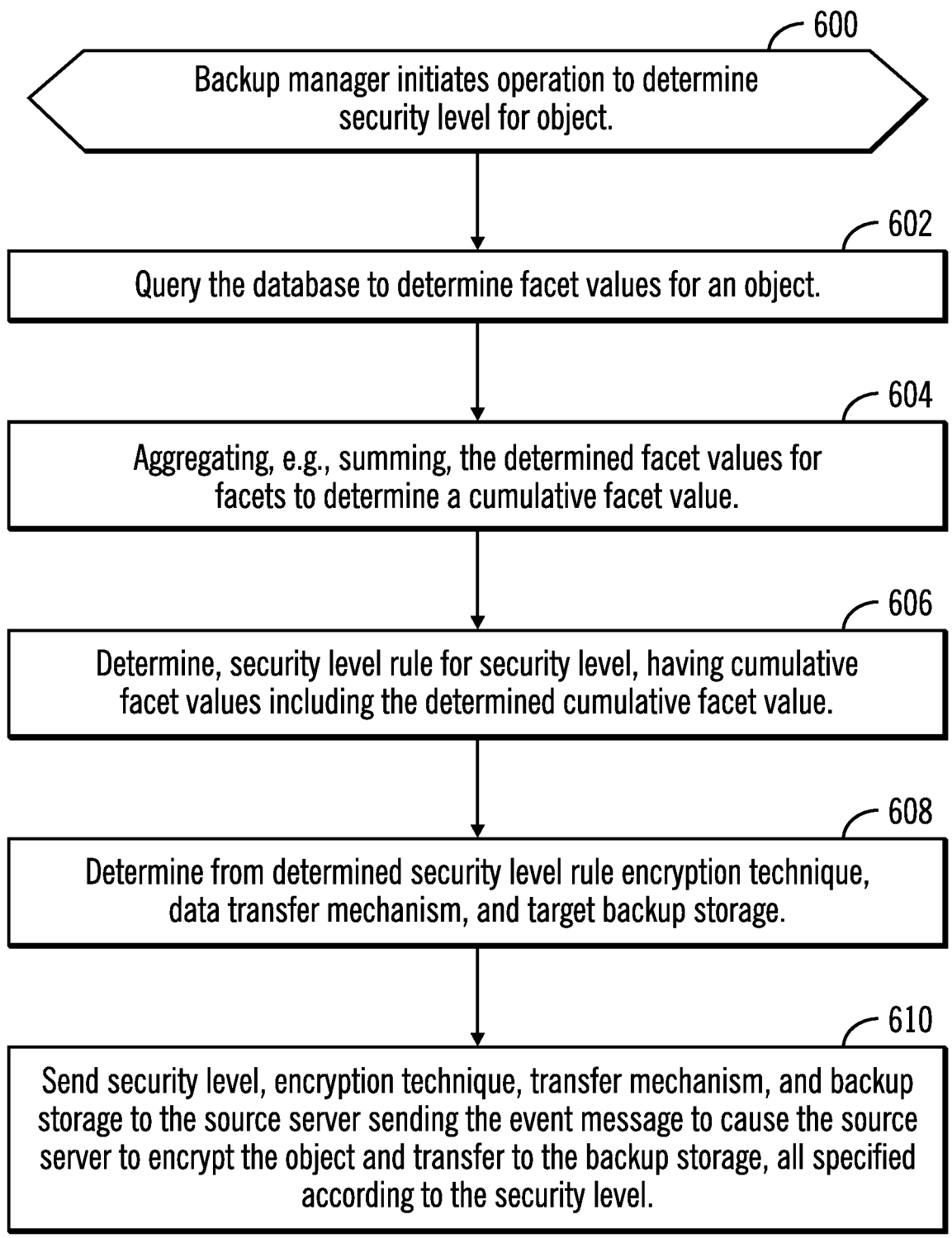
FIG. 6 illustrates an embodiment of operations to query a database to determine a security level for the object and encryption technique to encrypt the data object to store at a target backup storage.

FIG. 6 illustrates an embodiment of operations performed by the backup manager 132 to determine security level for data objects 104 indicated in received event messages 200 using the database 300. Upon initiating (at block 600) a backup operation, the backup manager 132 queries (at block 602) the database 300 to determine facet values 306 for an updated data object 304, such as a data object having a timestamp 208 greater than recent threshold time or that requires increased protection. The backup manager 132 aggregates (at block 604), e.g., sums, the determined facet values for the facets for the data object indicated in the query results to determine a cumulative facet value for the data object. In further embodiments, other techniques and functions may be used to calculate a cumulative facet value from the facet values for the data object. A security level rule $400_i$ is determined (at block 606) for a security level 402 having cumulative facet values 404 including the determined cumulative facet value. The backup manager 132 determines (at block 608) from the determined security level rule $400_i$ the encryption technique 406, data transfer mechanism 408, and target backup storage 410. The backup manager sends (at block 610) the determined security level 402, encryption technique 406, data transfer mechanism 408, and target backup storage 410 to the source server 102 that sent the event message 200 to cause the source server 102 to encrypt the modified data object 104 and transfer to the target backup storage 410 using the specified data transfer mechanism 408. In an alternative embodiment, the backup manager 132 may send just the determined security level for the object to the source server 102, for the source server 102 backup manager 112 to use to determine the encryption technique 406, data transfer mechanism 408, and target backup storage 410 to use to transfer the modified data object.

With the embodiment of FIGS. 5 an 6, the database 300 is immediately updated with updated facets for updated objects by processing the event messages 200 in the message queues $128_1$, $128_2$ ... $128_m$, where the event messages 200 are immediately generated at the source servers $102_1$, $102_2$ ... $102_n$ upon modifications to the data objects. This allows for real-time immediate processing of updated data objects to determine the encryption technique, data transfer mechanism, and target storage location for the new security level of the data object. Further, because the database 300 provides real-time information on updated data objects, the determined security level of a data object is based on the most recent fact values for a data object 104 resulting from modifications to the data object 104.

Figure 7:
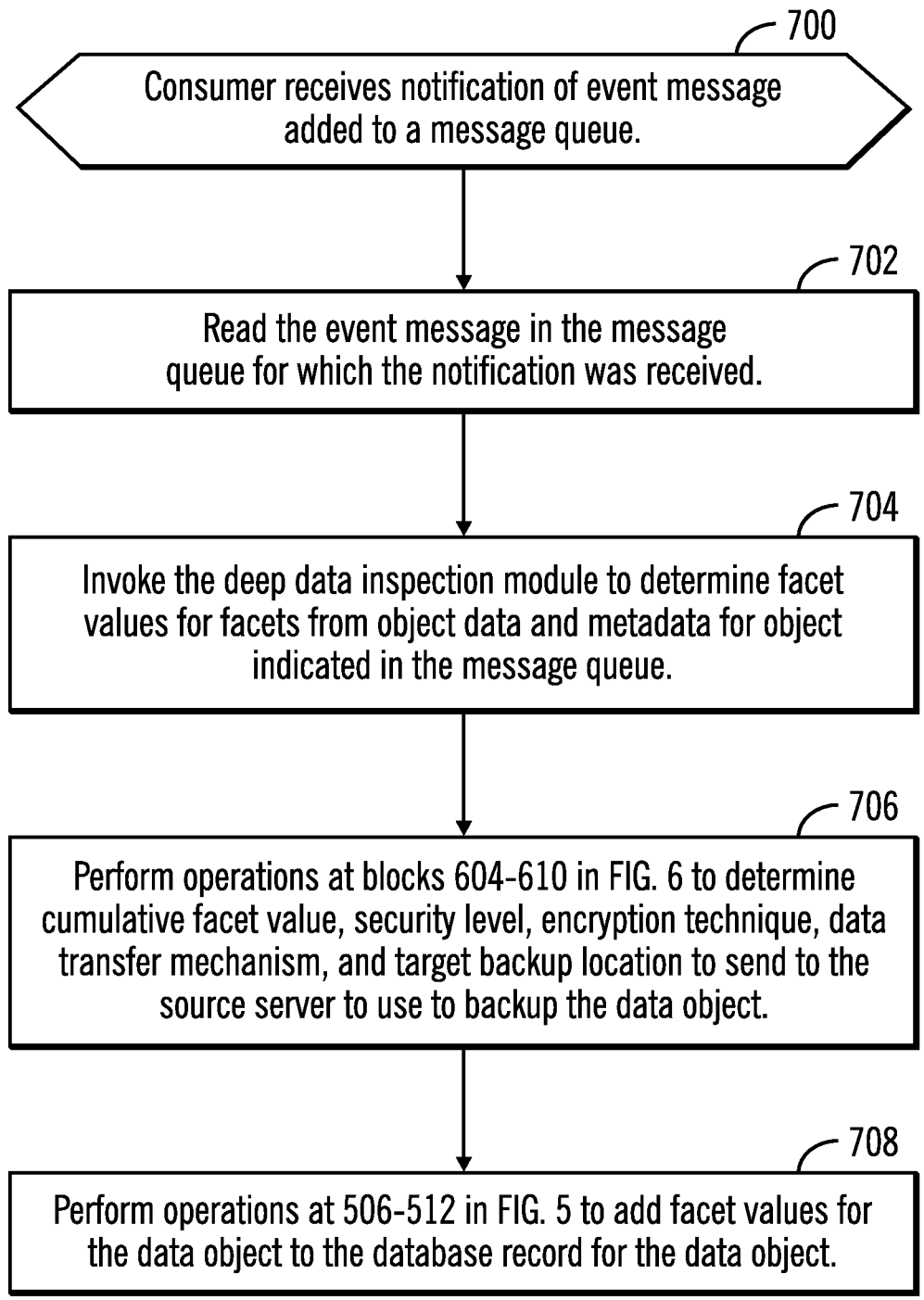
FIG. 7 illustrates an embodiment of operations to process an event message in a message queue for a data object to determine a security level for the object and encryption technique to encrypt the data object to store at a target backup storage.

FIG. 7 illustrate an alternative embodiment where the facet values for modified data objects are determined directly from the event messages 200 in the message queues $128_1$, $128_2$ ... $128_m$ without having to query the database 300, which allows for a faster determination of the data objects to backup, such as in real time from when the data object was changed. In certain embodiments, the changed data object 104 may be subject to processing for the new security level by processing from the message queue $128_i$ even before the changed data object in a memory of the source servers 102 has been written to the storage 106. After the event message dispatcher 126 adds the event message 200 to the event message queue $128_i$, the event message dispatcher 126 determines a consumer $130_i$ for the message queue $128_i$ and notifies the determined consumer $130_i$ to process the added event message 200.

Upon the consumer $130_i$ receiving (at block 700) the notification, the consumer $130_i$ reads (at block 702) the event message 200 in the message queue $128_i$ for which the notification was received. The consumer $130_i$ invokes (at block 704) the deep data inspection module 134 to determine facet values for facets from content and metadata for the data object 202 indicated in the read message 200 in the message queue $128_i$. The consumer $130_i$ may perform (at block 706) the operations at blocks 604-610 in FIG. 6 to determine the cumulative facet value, security level 402, encryption technique 406, data transfer mechanism 408, and target backup location 410 to send to the source server 102 to use to backup the modified data object 104. The consumer $130_i$ may further perform (at block 708) the operations at 506-512 in FIG. 5 to add facet values for the data object to the database record $300_i$ for the data object 104.

With the embodiment of FIG. 7, real-time reporting of changes to data objects in event message are processed by consumers $130_1$, $130_2$ ... $130_m$ subscribed to the message queue $128_i$ to which the real-time event message 200 is added to allow for an immediate determination of the security level for a modified data object, which may have changed. In this way, there are no delays to determine the security level, and encryption technique, data transfer mechanism, and target backup location to report to the source server 102. The current facet values for the data object 104 are immediately determined upon the consumer $130_i$ being alerted of the change to the data object to process for facet values. Further, in certain implementations, because the event message 200 is provided immediately to the storage server 100 even before the changed data object is stored in the storage 106, the determination of the new security level may be performed before the changed data object at the source server 102 or copied to the backup location.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
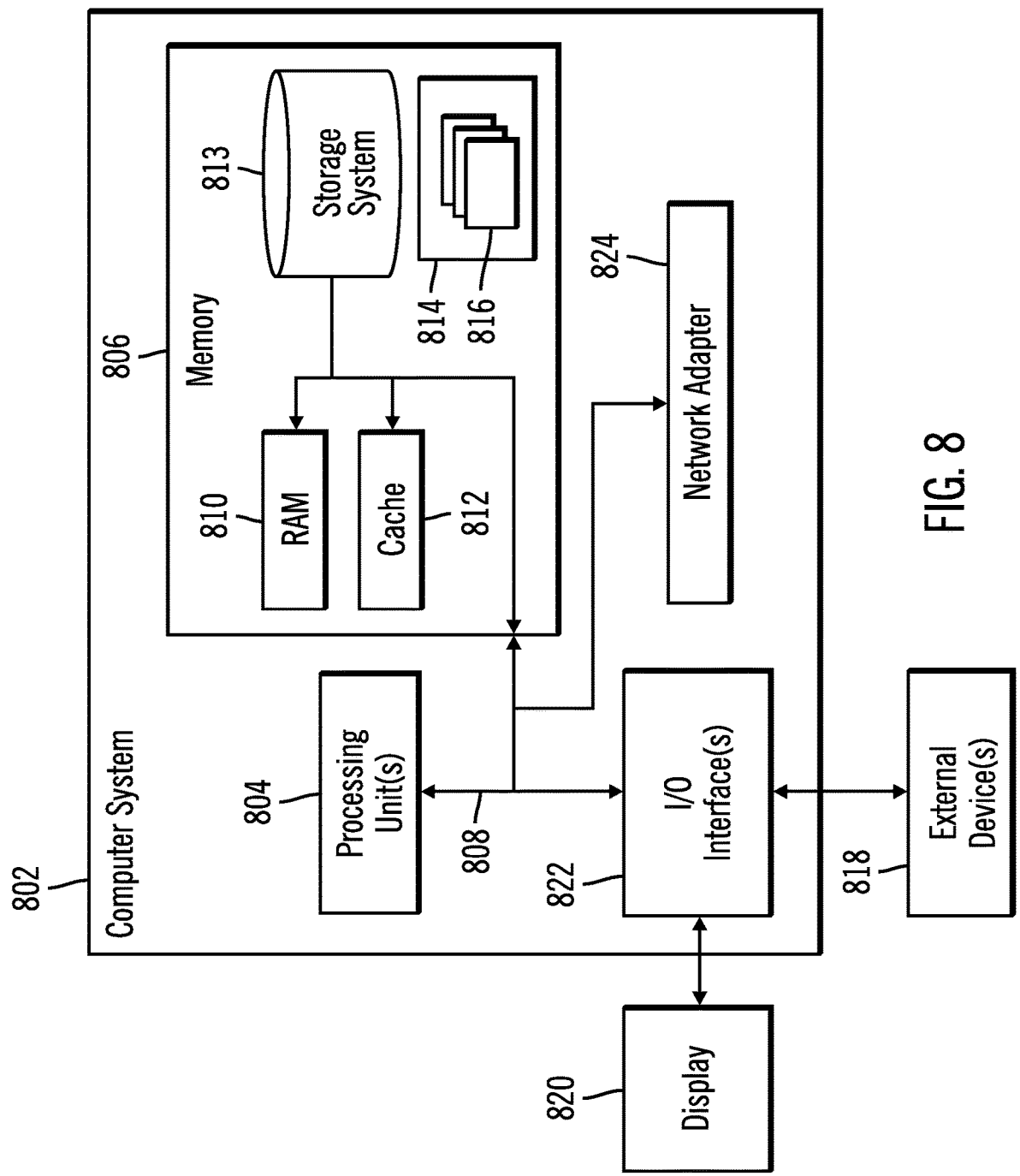
FIG. 8 illustrates a computing environment in which the components of FIG. 1 may be implemented.

The computational components of FIG. 1, including the storage server 100, source servers 102, and storage 106 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining an encryption technique for a modified data object to backup, wherein the computer program product comprises a computer readable storage medium having computer readable program code embodied therein that when executed performs operations, the operations comprising:
   providing encryption techniques, wherein each of the encryption techniques is associated with a different set of a plurality of unequal sets of values associated with the encryption techniques, wherein the values are representative of different degrees of sensitive information;
   performing deep data inspection of an object, using a natural language processing module to determine facet values that are quantifications of facets that are representative of aspects of sensitive information in the object;
   applying a function to the facet values for the object to determine a cumulative facet value for the object representing one of the different degrees of sensitive information in the object;
   selecting an encryption technique, comprising one of the encryption techniques, associated with a set including a value matching the cumulative facet value for the object; and
   encrypting, using the determined encryption technique, instances of sensitive information in the object to transfer to a backup storage.

2. The computer program product of claim 1, wherein the facet values determined by the deep data inspection indicate a true or false value indicating presence of a facet in the object and/or a degree of presence of the facet in the object, wherein the determined cumulative facet value comprises an aggregation of the facet values of the facets determined for the object.

3. The computer program product of claim 1, wherein the operations further comprise:
   determining a data transfer mechanism based on the determined cumulative facet value, wherein the object is transferred to the backup storage using the determined data transfer mechanism.

4. The computer program product of claim 1, wherein the operations further comprise:
   providing security levels, wherein each of the security levels is associated with one of the encryption techniques and the value associated with the encryption technique; and
   determining a security level, of the security levels, associated with the value comprising the determined cumulative facet value, wherein each of the security levels is associated with one of the encryption techniques, and wherein the determining the encryption technique comprises determining the encryption technique associated with the determined security level for the object.

5. The computer program product of claim 4, wherein the operations further comprise:
   determining whether the determined security level comprises a highest security level; and
   transferring the object to a portable storage device to ship to a remote location in response to determining that the determined security level comprises the highest security level.

6. The computer program product of claim 4, wherein the operations further comprise:
   providing an association of backup storage locations and security levels, wherein a first security level indicating a high level of sensitive information is associated with a first backup storage location providing a higher level of security than a second backup storage location, wherein a second security level lower than the first security level is associated with the second backup storage location;
   transferring the object to the first backup storage location in response to the security level comprising the first security level; and
   transferring the object to the second backup storage location in response to the security level comprising the second security level.

7. The computer program product of claim 1, wherein the operations of the performing the deep data inspection, the applying the function to the facet values, and the determining the encryption technique are performed in response to modifications of objects to provide real-time encryption and transfer of modified objects.

8. The computer program product of claim 1, wherein the natural language processing module utilizes ontology based natural language classification techniques to extract the facet values for sensitive information instances in the object to use do determine the encryption technique to use to encrypt the object.

9. The computer program product of claim 1, wherein the deep data inspection further processes metadata on the object indicating a type of the object and type of content of the object to determine the facet values for the object.

10. A computer program product for determining an encryption technique for a modified data object to backup, wherein the computer program product comprises a computer readable storage medium having computer readable program code embodied therein that when executed performs operations, the operations comprising:
   providing encryption techniques, wherein each of the encryption techniques is associated with a different set of a plurality of unequal sets of values associated with the encryption techniques, wherein the values are representative of different degrees of sensitive information;
   receiving event messages for objects in response to writes to objects, wherein at least one of the objects have at least one instance of sensitive information, wherein the objects include facet values representative of aspects of sensitive information and quantifications of facets;
   adding the event messages to a message queue;
   performing deep data inspection of an object, indicated in one of the event messages, using a natural language processing module to determine facet values that are quantifications of facets that are representative of aspects of sensitive information in the object;
   applying a function to the facet values for the object to determine a cumulative facet value for the object representing one of the different degrees of sensitive information in the object;
   selecting an encryption technique, comprising one of the encryption techniques, associated with a set including a value matching the cumulative facet value for the object; and
   encrypting, using the determined encryption technique, the instances of sensitive information in the object to transfer to a backup storage.

11. The computer program product of claim 10, wherein the operations further comprise:
   adding information to a database for each of the event messages in the message queue for the objects modified by writes; and
   adding the facet values determined for the objects, resulting from the deep data inspection, to the information in the database for the event messages for the modified objects.

12. The computer program product of claim 11, wherein the operations further comprise:
   querying the database to determine facet values for an object indicated in the event message in the message queue, wherein the encryption technique is determined for the determined facet values resulting from the querying of the database.

13. The computer program product of claim 10, wherein the deep data inspection is performed in response to adding the event messages for the objects to the message queue.

14. A system for determining an encryption technique for a modified data object to backup, comprising:
   a processor; and
   a computer readable storage medium having computer readable program code embodied therein that when executed by the processor, performs operations, the operations comprising:
      providing encryption techniques, wherein each of the encryption techniques is associated with a different set of a plurality of unequal sets of values associated with the encryption techniques, wherein the values are representative of a degree of sensitive information;
      performing deep data inspection of an object, using a natural language processing module, to determine facet values that are quantifications of facets that are representative of aspects of sensitive information in the object;

applying a function to the facet values for the object to determine a cumulative facet value representing one of the different degrees of sensitive information in the object;

selecting an encryption technique, comprising one of the encryption techniques, associated with a set including a value matching the cumulative facet value for the object; and encrypting, using the determined encryption technique, instances of sensitive information in the object to transfer to a backup storage.

15. The system of claim 14, wherein the operations further comprise:

determining a data transfer mechanism based on the determined cumulative facet value, wherein the object is transferred to the backup storage using the determined data transfer mechanism.

16. The system of claim 14, wherein the operations further comprise:

providing security levels, wherein each of the security levels is associated with one of the encryption techniques and the value associated with the encryption technique; and determining a security level, of the security levels, associated with the value comprising the determined cumulative facet value, wherein each of the security levels is associated with one of the encryption techniques, and wherein the determining the encryption technique comprises determining the encryption technique associated with the determined security level for the object.

17. The system of claim 16, wherein the operations further comprise:

providing an association of backup storage locations and security levels, wherein a first security level indicating a high level of sensitive information is associated with a first backup storage location providing a higher level of security than a second backup storage location, wherein a second security level lower than the first security level is associated with the second backup storage location;

transferring the object to the first backup storage location in response to the security level comprising the first security level; and transferring the object to the second backup storage location in response to the security level comprising the second security level.

18. A system for determining an encryption technique for a modified data object to backup, comprising:

a processor; and a computer readable storage medium having computer readable program code embodied therein that when executed by the processor, performs operations, the operations comprising:

providing encryption techniques, wherein each of the encryption techniques is associated with a different set of a plurality of unequal sets of values associated with the encryption techniques, wherein the values are representative of different degrees of sensitive information in a presented object;

receiving event messages for objects in response to writes to objects, wherein at least one of the objects have at least one instance of sensitive information, wherein the object includes facet values representative of aspects of sensitive information, wherein the facet values are quantifications of facets;

adding the event messages to a message queue;

performing deep data inspection of an object, indicated in one of the event messages, using a natural language processing module, to determine facet values that are quantifications of facets that are representative of aspects of sensitive information in the object;

applying a function to the facet values for the object to determine a cumulative facet value for the object representing one of the different degrees of sensitive information in the object;

selecting an encryption technique, comprising one of the encryption techniques associated with a set including a value matching the cumulative facet value for the object; and encrypting, using the determined encryption technique, the instances of sensitive information in the object to transfer to a backup storage.

19. The system of claim 18, further comprising:

adding information to a database for each of the event messages in the message queue for the objects modified by writes; and adding the facet values determined for the objects, resulting from the deep data inspection, to the information in the database for the event messages for the modified objects.

20. The system of claim 19, wherein the operations further comprise:

querying the database to determine facet values for an object indicated in the event message in the message queue, wherein the encryption technique is determined for the determined facet values resulting from the querying of the database.

21. The system of claim 18, wherein the deep data inspection is performed in response to adding the event messages for the objects to the message queue.

22. A computer implemented method for determining an encryption technique for a modified data object to backup, comprising:

providing encryption techniques, wherein each of the encryption techniques is associated with a different set of a plurality of unequal sets of values associated with the encryption techniques, wherein the values are representative of different degrees of sensitive information;

performing deep data inspection of an object, using a natural language processing module, to determine facet values that are quantifications of facets that are representative of aspects of sensitive information in the object;

applying a function to the facet values for the object to determine a cumulative facet value for the object representing one of the different degrees of sensitive information in the object;

selecting an encryption technique, comprising one of the encryption techniques associated with a set including a value matching the cumulative facet value for the object; and encrypting, using the determined encryption technique, instances of sensitive information in the object to transfer to a backup storage.

23. The method of claim 22, further comprising:

providing security levels, wherein each of the security levels is associated with one of the encryption techniques and a value associated with the encryption technique; and determining a security level, of the security levels, associated with the value comprising the determined cumulative facet value, wherein each of the security levels is associated with one of the encryption techniques, and wherein the determining the encryption technique comprises determining the encryption technique associated with the determined security level for the object.

24. The method of claim 23, further comprising:
providing an association of backup storage locations and security levels, wherein a first security level indicating a high level of sensitive information is associated with a first backup storage location providing a higher level of security than a second backup storage location, wherein a second security level lower than the first security level is associated with the second backup storage location;
transferring the object to the first backup storage location in response to the security level comprising the first security level; and
transferring the object to the second backup storage location.

25. The method of claim 22, wherein the performing the deep data inspection, the applying the function to the facet values, and the determining the encryption technique are performed in response to modifications of objects to provide real-time encryption and transfer of modified objects.

* * * * *